July 5, 1949.  P. R. SAMMONS  2,475,202
SERVING TRAY FOR VEHICLES
Filed Dec. 29, 1945
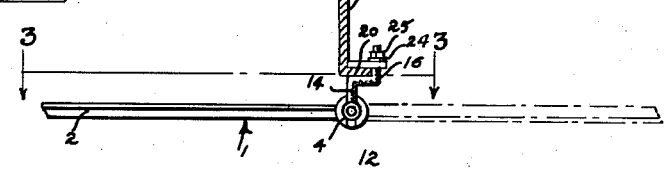
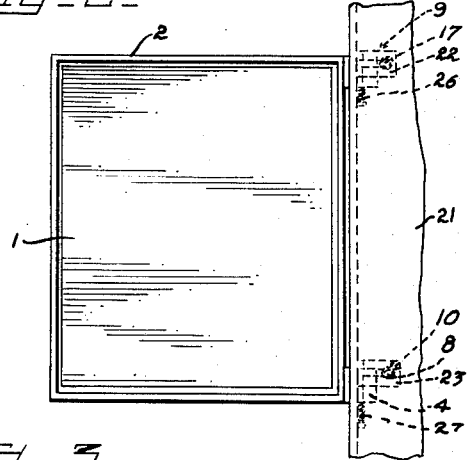
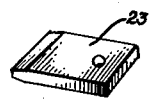
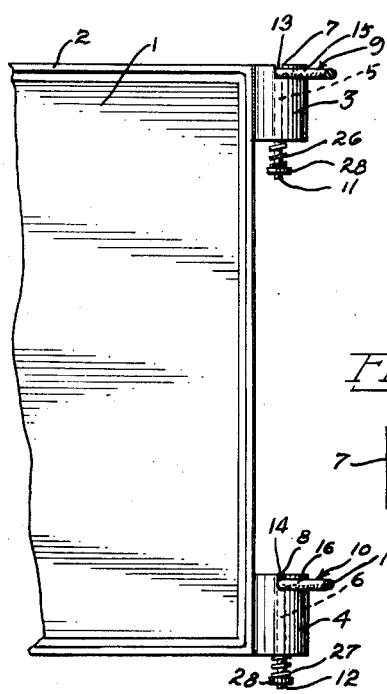
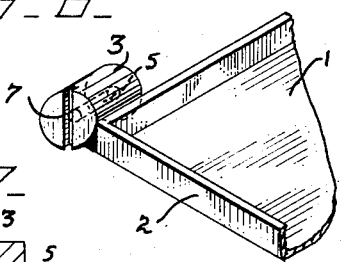
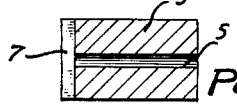
Inventor
Paul R. Sammons
By Clarence A. O'Brien
and Harvey B. Jacobson
Attorneys Patented July 5, 1949

2,475,202

UNITED STATES PATENT OFFICE 2,475,202

SERVING TRAY FOR VEHICLES

Paul R. Sammons, Corpus Christi, Tex., assignor, by direct and mesne assignments, to Specialties, Inc., a corporation of Texas Application December 29, 1945, Serial No. 638,009

3 Claims. (Cl. 311—21)

This invention relates to improvements in serving trays, and more particularly to a serving tray which will be secured to the dash board of an automobile.

An object of the invention is to provide a serving tray for positioning upon the dash board of an automobile, which will be so arranged and constructed that it may be swung outwardly when it is desired to use the tray, and which may be swung about a pivot to be positioned behind or forwardly of the dash board when the tray is not in use.

Another object of the invention is to provide an improved serving tray for automobiles, which will be supported by the dash board of the automobile, and which will include locking means formed in the bearing hinges for the tray for supporting the tray in extended position when in use, and for locking the tray in retracted or hidden position when the tray is not in use.

A still further object of the invention is to provide an improved serving tray for attachment to the dash board of an automobile, which will be highly efficient in use and which will be relatively inexpensive to manufacture and produce.

Other objects will appear as the description proceeds.

In the accompanying drawings which form a part of this application:

Figure 1 is a sectional view taken through the dash board of an automobile, showing the improved serving tray in extended position for use, and shown in dotted lines when in retracted position;

Figure 2 is a plan view of the present serving tray showing the same applied to the dash board of an automobile;

Figure 3 is a view taken on the line 3—3 of Figure 1;

Figure 4 is a perspective view of the dash board engaging clamping lug;

Figure 5 is a perspective view of the combined bearing and locking arm;

Figure 6 is a perspective view of a corner of the tray showing one of the combined bearing and hinge members formed on the tray, and Figure 7 is a vertical sectional view taken through the combined bearing and hinge member.

Like characters of reference are used throughout the following specification and the accompanying drawings to designate corresponding parts.

The present serving tray comprises a body portion 1, preferably made of metal, and is formed with an upstanding flange 2 surrounding the said body portion. Secured to the body portion 1 of the tray, and preferably formed integrally therewith, are the pair of spaced combined bearing and hinge members 3 and 4 which are located on one side of the said tray and adjacent the opposite ends thereof.

Axially aligned bearing openings 5 and 6 are formed longitudinally through the said combined bearing and hinge members 3 and 4, and merge into the vertically disposed locking slots 7 and 8 formed in the ends of the said bearing and hinge members. The integrally formed bearing and locking rods 9 and 10 are provided with elongated pivot pins or pintles 11 and 12, which are adapted to extend through the axially aligned bearing openings 5 and 6 in the bearing and hinge members, and to extend a considerable distance beyond the ends thereof. The opposite ends of the pintles 11 and 12 are bent upwardly at right angles as at 13 and 14, and the rods are bent forwardly as at 15 and 16, and then upwardly to form the upper terminal ends 17 and 18, which are threaded as at 19. The forwardly bent portions 15 and 16 of the rods will underlie the inturned flange 20 on the automobile dash board 21, and the upwardly extending terminal ends will lie immediately forward of the end of the inturned flange, and will support the clamping lugs 22 and 23, which are perforated to be placed over the terminal ends 17 and 18 and to contact the upper surface of the said inturned flange 20. If desired the flange engaging surface of the lugs 22 and 23 may be roughened to assist in supporting the rods in position upon the flange of the dash board. A washer 24 and nut 25 will be threaded onto the threaded ends of the terminal ends 17 and 18 to clamp the arms in position.

The bent angular portions 13 and 14 will be adapted to be received within the locking slots 7 and 8 in the bearing and hinge members 3 and 4, and will be held therein by means of the coil springs 26 and 27 placed about the free ends of the elongated pintles 11 and 12, and will be supported thereon by a cross-pin 28, or by a nut when it is desired to place more tension upon the said springs.

From the foregoing description, it will be apparent that the tray will be supported upon the inturned flange of the dash board of an automobile, and when the tray is in position for use, it will be swung outwardly to extend at right angles to the said dash board, as illustrated in full lines in Figure 1 of the drawings, the tray being locked in this position by means of the portions 13 and 14 being resiliently held in the locking slot in the said bearing and hinge members 3 and 4. When it is desired to place the tray in position of not in use, it is only necessary to grasp the tray and move it to the right on the pintles 11 and 12 of the rods 9 and 10, whereupon the portions 13 and 14 will be moved free of the locking slots 7 and 8, at which time the tray may be swung downwardly and forwardly to assume the position illustrated in dotted lines in Figure 1 of the drawings. When the tray is in position of non-use, the portions 13 and 14 of the rods 9 and 10 will again be positioned within the locking slots 7 and 8, and held therein by means of the springs 26 and 27.

While the preferred embodiment of the invention has been described and illustrated, it will be understood that it is not intended to limit the scope of the invention to this disclosure, as many minor changes in detail of construction may be resorted to without departure from the spirit of the invention.

Having thus described my invention, what I claim as new and desire to secure by Letters Patent of the United States is:

1. In combination with a vehicle dashboard having a lower inturned flanged portion, a serving tray comprising a shelf, a pair of opposed sleeves fixedly carried by said shelf, a pair of substantially L-shaped supports having bearing legs and support legs, bearing plates adjustably mounted on said support legs cooperating with said bearing legs to provide adjustable clamps, angular extensions carried by the free extremities of said bearing legs, angular pivot pins fixedly carried by said angular extensions for engaging said sleeves, said shelf mounted for pivotal movement forwardly and rearwardly relative to the dashboard, locking recesses provided in said sleeves for engaging said angular extensions when said shelf is pivoted to a forward or rear position, and means normally urging said angular extensions into said locking recesses.

2. In combination with a vehicle dashboard having a lower inturned flanged portion, a serving tray comprising a shelf, a pair of opposed sleeves fixedly carried by said shelf, a pair of substantially L-shaped supports having bearing legs and support legs, bearing plates adjustably mounted on said support legs cooperating with said bearing legs to provide adjustable clamps, angular extensions carried by the free extremities of said bearings legs, angular pivot pins fixedly carried by said angular extensions for engaging said sleeves, said shelf mounted for pivotal movement forwardly and rearwardly relative to the dashboard, said sleeves including inner and outer end portions, diametrical grooves provided in the outer end portions of said sleeves for receiving said angular extensions during predetermined pivotal movement of said shelf, and means yieldingly urging said angulated extensions into said grooves.

3. The combination of claim 2 wherein said last mentioned means includes spring members embracing said pivot pins, and stops carried by said pivot pins, said spring members being biased between said stops and the inner end portions of said sleeve.

PAUL R. SAMMONS.

REFERENCES CITED

The following references are of record in the file of this patent:

UNITED STATES PATENTS

| Number | Name | Date |
|---|---|---|
| 672,573 | Sidney | Apr. 23, 1901 |
| 839,729 | Chance | Dec. 25, 1906 |
| 1,024,804 | Mergner | Apr. 30, 1912 |
| 1,337,886 | Debakey | Apr. 20, 1920 |
| 1,398,496 | Saltalamachia | Nov. 29, 1921 |
| 1,533,661 | Remillong | Apr. 14, 1925 |
| 1,870,109 | Goforth | Nov. 9, 1931 |
| 1,900,325 | Bayman et al. | July 25, 1931 |
| 2,231,487 | Teuber | Feb. 11, 1941 |
| 2,270,948 | Howe | Mar. 5, 1942 |